Figure 1:
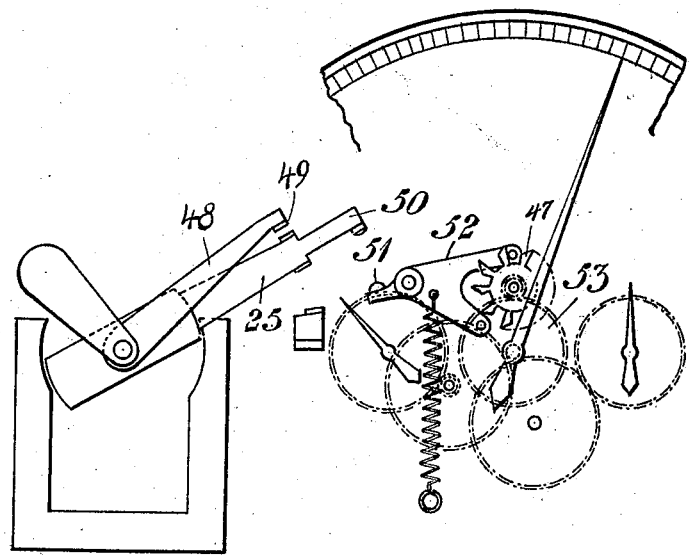

April 8, 1924.

F. E. L. SUNDBAUM 1,489,718

PRESSURE GAUGE LOG

Filed Dec. 13, 1921

2 Sheets-Sheet 1

FRANS ERIC LUDVIG SUNDBAUM.

*Inventor:* per Hazeltine Seats

*Attorneys.*

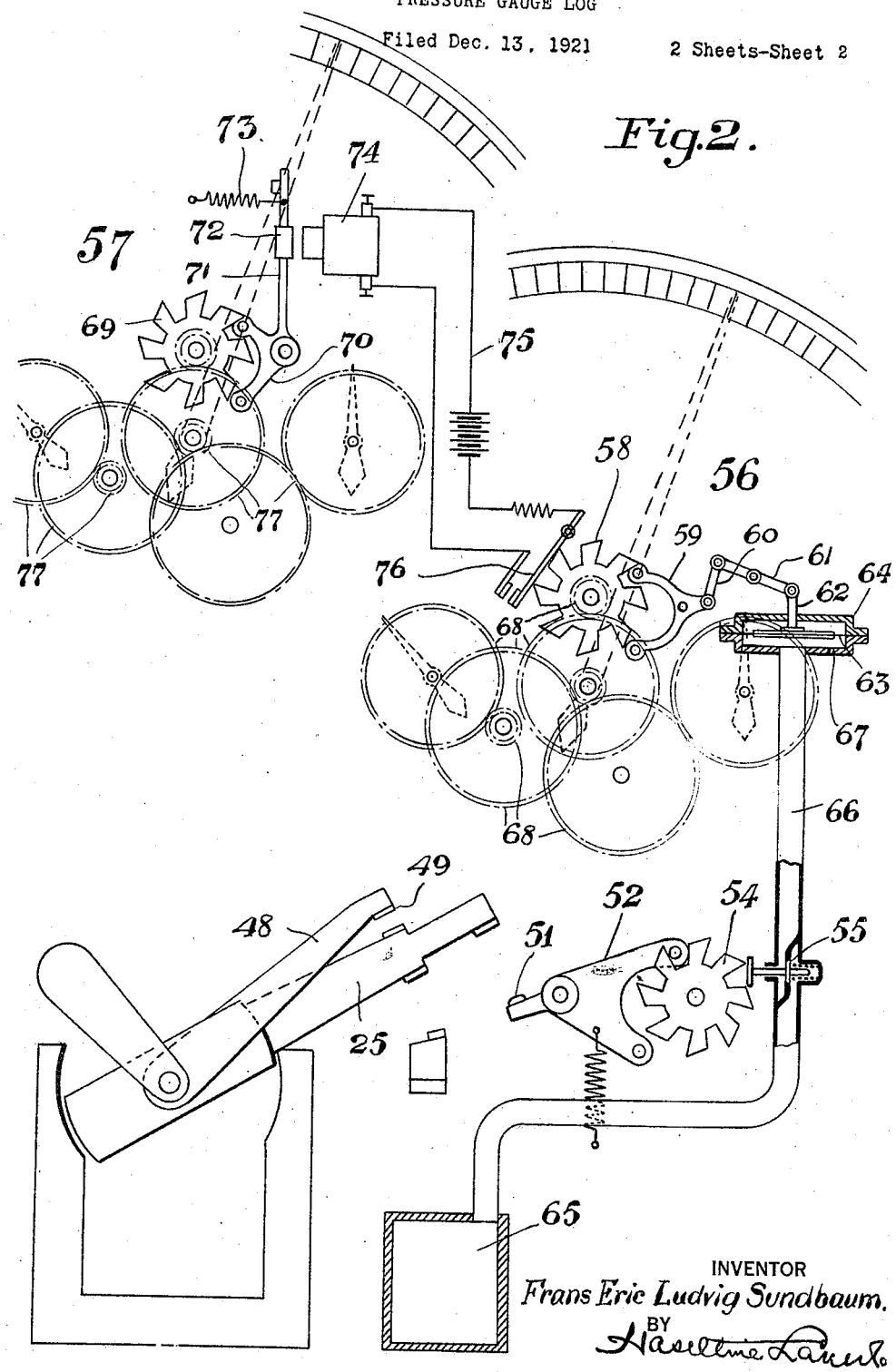

Patented Apr. 8, 1924.

1,489,718

UNITED STATES PATENT OFFICE.

FRANS ERIK LUDVIG SUNDBAUM, OF STOCKHOLM, SWEDEN.

PRESSURE-GAUGE LOG.

Application filed December 13, 1921. Serial No. 522,068.

*To all whom it may concern:*

Be it known that I, FRANS ERIK LUDVIG SUNDBAUM, a subject of the King of Sweden, residing at Stockholm, Sweden, have invented certain new and useful Improvements in Pressure-Gauge Logs (for which I have filed application in Sweden, Dec. 9, 1920, No. 5723), of which the following is a specification.

This invention relates to pressure-gauge logs, and relates more particularly to logs of the type described in the specification of my prior Patent No. 1,323,119 dated November 25, 1919, in which one or more indicators, located at a distance from the speed indicating device, is or are controlled by such device so as to indicate the distance travelled by the vessel.

In accordance with the invention described in the specification of my said prior patent, the device for indicating the speed of the vessel cooperates with a distance indicating device (or devices) operated by electrical means having a circuit making and breaking device controlled by the speed indicating means and having its speed of operation—i. e., the frequency of the making and breaking of the circuit per unit of time—varied in accordance with the speed of the vessel. In accordance with my prior invention the distance indicating device was thus operated, from the speed indicator, solely by electrical means.

In accordance with the present invention, the distance indicating device (or devices) is operated from the speed indicator by mechanical or like means, the object of this invention thus being to provide means, other than electrical, whereby one or more devices located at any convenient distance from the speed indicator may be operated and controlled from such indicator in order to register the distance travelled by the vessel.

As in my prior invention, a continuously oscillating member cooperates with the speed indicating device and is adapted to control the operation of the indicating or registering device located at a distance from the speed indicator and adapted to indicate or register the distance travelled by the vessel.

An object of the present invention is to provide mechanism operated by positive mechanical means from the oscillating member for controlling the operation of the distance indicator. A further object of the invention is to provide pneumatic means actuating in conjunction with said mechanical means for controlling the operation of a distance indicating device located at a substantial distance from the oscillating member.

The construction and operation of the instrument will now be more particularly described with reference to the accompanying drawings whereon Fig. 1 is a diagrammatic view of the apparatus made in accordance with the present invention and showing the oscillating member as disclosed in the said prior patent. Fig. 2 is a similar view showing a modified arrangement having two distance indicating devices, one located in proximity to the oscillating member and the other located at a substantial distance therefrom.

In the form shown at Fig. 1, 25 is a pivotally mounted arm which is caused to oscillate between two stops 49 and 51, as in the said prior patent, the one 49 of which is mounted upon an arm 48 the position of which is determined by the speed of the vessel as described in the prior patent, in such a manner that the angular distance between the stops 49, 51 will vary in accordance with the speed of the vessel. The arm 25 may be driven electrically for instance as in the said prior patent, but it also can be driven by mechanical or pneumatic means, in any suitable manner.

In the form shown the arm 25 is provided with an extension 50 which in the lowermost position of the arm engages and depresses the stop 51 which is mounted upon a swinging feed device 52, by means of which the toothed wheel 47 and the train of gears 53 are operated to indicate or register the distance travelled by the vessel.

In the form shown at Fig. 2 the continuously oscillating arm 25, as in Fig. 1, oscillates between stops 51 and 49, the position of the latter being controlled by the position of the arm 48 and the speed of the vessel whilst the stop 51 is formed on and is adapted to operate the oscillating feed device 52 by means of which a step-by-step motion is imparted to the toothed wheel 54. The teeth of the wheel 54 engage the projecting end of a valve 55 in such manner that the valve is depressed by a tooth and is opened at each movement of the wheel; the return or closing movement of the valve being effected by means of a spring.

The distance indicating device 56 has a toothed wheel 58 to which a step-by-step motion is imparted by an oscillating feed device 59 operated through the medium of a link 60, a rocking lever 61 and a link 62 from a diaphragm 63 mounted in a casing 64 and having fluid pressure supplied to the underside thereof from a container 65 by means of a conduit 66; the passage of the fluid to the diaphragm being controlled by means of the said valve 55 and the fluid pressure beneath the diaphragm being released by a small vent hole 67 in the casing 64 after each movement of the diaphragm. The distance indicator 56 is operated from the spindle of the wheel 58 by means of the usual train of gears 68 in the ordinary well-known manner.

The distance indicating device 57 which may be located at a substantial distance from the speed indicator, may readily be operated in the same manner as the device 56 by pneumatic means from the wheel 54 or by similar means from the wheel 58, but if so desired electrical means may be provided for communicating the operation of one distance indicator to the other, and in the form shown on this figure the indicator 57 is actuated electrically from the wheel 58 in the following manner. The usual train of gears 77 in the indicator 57 is operated from a toothed wheel 69 to which a step-by-step motion is imparted by an oscillating feed member 70 which is provided, in addition to the two arms engaging the tooth of the wheel 69, with an arm 71 carrying an armature 72 which is normally held by the action of a spring 73 away from an electro-magnet 74 in such manner that the oscillation of the lever 71 by the action of the magnet 74 may transmit the desired step-by-step motion to the wheel 69. In the circuit 75 of the magnet 74 is a switch 76 operated mechanically by the teeth of the wheel 58 so that the wheel 58 of the indicator 56 and the wheel 69 of the indicator 57 are caused to actuate simultaneously and at an equal speed, thereby simultaneously indicating or recording on both indicators 56, 57 the distance travelled by the vessel.

I claim:—

1. Indicator operating means for a pressure gauge log of the character described comprising an oscillating member having a constant angular velocity, means whereby the length of the oscillations may be controlled inversely with the speed of travel, an indicator for indicating the distance travelled by the vessel, and positive mechanical means operated directly by the oscillating member with each oscillation thereof for controlling the operation of the distance indicator.

2. Indicator operating means for a pressure gauge log of the character described comprising an oscillating member having a constant angular velocity, means whereby the length of the oscillations may be controlled inversely with the speed of travel, an indicator for indicating the distance travelled by the vessel, and mechanical means under the control of the oscillating member for imparting a step-by-step movement to the distance indicator, with each oscillation of the member.

3. Indicator operating means for a pressure gauge log of the character described comprising an oscillating member having a constant angular velocity, means whereby the length of the oscillations may be controlled inversely with the speed of travel, an indicator for indicating the distance travelled by the vessel, a mechanical device operated by the oscillating member, and pneumatic means adapted to be controlled by said device for imparting a step-by-step movement to the distance indicator with each oscillation of the member.

4. Indicator operating means for a pressure gauge log of the character described comprising an oscillating member having a constant angular velocity, means whereby the length of the oscillations may be controlled inversely with the speed of travel, an indicator for indicating the distance travelled by the vessel, a rocking feed member operated by the oscillating member, a rotary device to which a step-by-step motion is imparted by the feed member, and means for transmitting such step-by-step motion from the rotary device to the distance indicator.

5. Indicator operating means for a pressure gauge log of the character described comprising an oscillating member having a constant angular velocity, means whereby the length of the oscillations may be controlled inversely with the speed of travel, an indicator for indicating the distance travelled by the vessel, a mechanical device operated directly by the oscillating member, a mechanical device operating the distance indicator and fluid pressure means actuated by the first mechanical device and operating the second mechanical device.

6. Indicator operating means for a pressure gauge log of the character described comprising an oscillating member having a constant angular velocity, means whereby the length of the oscillations may be controlled inversely with the speed of travel, an indicator for indicating the distance travelled by the vessel, a rotary member, means operated directly by the oscillating member for imparting a step-by-step movement to the rotary member, a mechanical device for operating the distance indicator and fluid pressure means for transmitting such step-by-step movement to the said operating device of the distance indicator.

7. Indicator operating means for a pressure gauge log of the character described comprising an oscillating member having a constant angular velocity, means whereby the length of the oscillations may be controlled inversely with the speed of travel, an indicator for indicating the distance travelled by the vessel, a rocking feed member actuated by the oscillating member, a rotary member having a step-by-step movement imparted thereto by the said feed member, a second rotary member for imparting a step-by-step movement directly to the distance indicator, and pneumatic means for transmitting motion from the first rotary member to the second.

In testimony whereof I affix my signature in presence of two witnesses.

FRANS ERIK LUDVIG SUNDBAUM.

Witnesses:
 H. HAMMAR,
 SVEN SVENSON.